US006956606B2

(12) United States Patent  (10) Patent No.: US 6,956,606 B2
Mabuchi  (45) Date of Patent: Oct. 18, 2005

(54) SOLID-STATE IMAGE PICKUP DEVICE AND CAMERA SYSTEM

(75) Inventor: Keiji Mabuchi, Kanagawa (JP)

(73) Assignee: Sony Corporation, (JP)

( * ) Notice: Subject to any disclaimer, the term of this patent is extended or adjusted under 35 U.S.C. 154(b) by 793 days.

(21) Appl. No.: 09/918,456

(22) Filed: Aug. 1, 2001

(65) Prior Publication Data

US 2002/0032545 A1  Mar. 14, 2002

(30) Foreign Application Priority Data

Aug. 3, 2000 (JP) .......................... P2000-235341

(51) Int. Cl.$^7$ .......................... H04N 3/14; H04N 9/64; H01L 27/00; H01L 27/148
(52) U.S. Cl. .................. 348/308; 348/248; 250/208.1; 257/230
(58) Field of Search .............................. 348/248, 249, 348/314, 241, 294, 296, 300, 301, 302, 307, 348/308; 250/208.1; 358/513, 514; 257/223, 257/230, 445

(56) References Cited

U.S. PATENT DOCUMENTS

| | | | | |
|---|---|---|---|---|
| 5,406,332 A | * | 4/1995 | Shinohara et al. | ........... 348/308 |
| 5,786,588 A | * | 7/1998 | Takahashi | ............... 250/208.1 |
| 5,907,357 A | * | 5/1999 | Maki | ........................... 348/241 |
| 6,049,357 A | * | 4/2000 | Shinohara | .................. 348/307 |
| 6,141,050 A | * | 10/2000 | Ackland et al. | ............ 348/308 |
| 6,380,976 B1 | * | 4/2002 | Borg | ........................... 348/308 |
| 6,593,560 B2 | * | 7/2003 | Misek | ...................... 250/208.1 |
| 6,727,946 B1 | * | 4/2004 | Zhao et al. | ................. 348/308 |
| 6,864,476 B2 | * | 3/2005 | Dai | ........................ 250/208.1 |
| 6,864,920 B1 | * | 3/2005 | Kindt et al. | ................ 348/308 |
| 6,888,573 B2 | * | 5/2005 | Herold | ....................... 348/314 |
| 2003/0146993 A1 | * | 8/2003 | Kokubun et al. | ........... 348/308 |
| 2004/0227832 A1 | * | 11/2004 | Loose | ........................ 348/308 |

FOREIGN PATENT DOCUMENTS

| | | | | |
|---|---|---|---|---|
| EP | 0 908 957 A2 | 4/1999 | | |
| JP | 06189204 A | * | 7/1994 | .......... H04N 5/335 |
| KR | 2001036207 A | * | 5/2001 | .......... H03K 17/22 |
| WO | 98/56168 | 12/1998 | | |

\* cited by examiner

Primary Examiner—Wendy R. Garber
Assistant Examiner—John M. Villecco
(74) Attorney, Agent, or Firm—Rader, Fishman & Grauer PLLC; Ronald P. Kananen

(57) ABSTRACT

In an MOS type solid-state image pickup device in which unit pixels each including a photodiode, a transfer transistor for transferring the signal of the photodiode to a floating node N11, an amplifying transistor for outputting the signal of the floating node to a vertical signal line, and a reset transistor for resetting the floating node are arranged in a matrix form, a P-type MOS transistor is connected between a drain line to which the drain of the reset transistor is connected and a V shift register for selectively supplying the reset voltage to the drain line, and the potential of the floating node is set to the channel voltage of the P-type MOS transistor at the non-selection time.

2 Claims, 3 Drawing Sheets

SOLID-STATE IMAGE PICKUP DEVICE AND CAMERA SYSTEM

BACKGROUND OF THE INVENTION

1. Field of the Invention

The present invention relates to a solid-state image pickup device and a camera system using the same, and particularly to an X-Y address type solid-state image pickup device which is represented by an MOS type solid-state image pickup device, and a camera system using the solid-state image pickup device as an image pickup device.

2. Description of the Related Art

As an X-Y address type solid-state image pickup device such as an MOS type solid-state image pickup device, an image pickup device including many unit pixels arranged in a matrix form has been known, each unit pixel being constructed by three transistors. FIG. 4 shows the construction of each unit pixel of the above image pickup device. As is apparent from FIG. 4, each unit pixel 100 comprises a photodiode (PD) 101, a transfer transistor 102, an amplifying transistor 103 and a reset transistor 104.

According to an MOS type solid-state image pickup device using the above pixel array, the potential of a floating node N101 is set to low level (hereinafter referred to as "L level") on the basis of a signal input from a drain line 105 through the reset transistor 104 during a non-selection period for which a line is non-selected, and the potential of the floating node N101 is set to high level (hereinafter referred to as "H level") when the line is selected.

As described above, in the conventional MOS type solid-state image pickup device including unit pixels each of which comprises three transistors, the potential of the floating node N101 is set to the L level (0V) during the non-selection period, so that electrons may leak from the floating node N101 into the photodiode 101, resulting in occurrence of noises.

SUMMARY OF THE INVENTION

The present invention has been implemented in view of the foregoing problem of the conventional solid-state image pickup device, and has an object to provide a solid-state image pickup device which can prevent electrons from leaking from a floating node to a photodiode to thereby reduce noises caused by the leakage of the electrons. The present invention has another object to provide a camera system using the solid-state image pickup device thus constructed as an image pickup device.

In order to attain the above object, according to a first aspect of the present invention, a solid-state image pickup device having unit pixels arranged in a matrix form, each unit pixel comprising a photoelectrical conversion element, a transfer transistor for transferring a signal of the photoelectrical conversion element to a floating node, an amplifying transistor for outputting a signal of the floating node to a signal line, and a reset transistor for resetting said floating node, is characterized in that a P-type MOS transistor is connected between a wire to which a main electrode of the reset transistor at the opposite side to the floating node is connected and a driving circuit for selectively applying a reset voltage to the wire.

According to a second aspect of the present invention, there is provided a camera system using the above solid-state image pickup device as an image pickup device.

According to the solid-state image pickup device of the first aspect of the present invention and the camera system of the second aspect of the present invention, when the reset voltage is output from the driving circuit, the P-type MOS transistor is conducted to thereby apply the reset voltage to the wire. The reset voltage is supplied through the reset transistor to the floating node to thereby reset the potential of the node concerned. On the other hand, when no reset voltage is output from the driving circuit, the channel voltage of the P-type MOS transistor is applied to the wire. When the reset transistor is conducted, the potential of the floating node is determined by the channel voltage of the P-type MOS transistor, and thus it is not equal to 0V. Therefore, the leakage of charges from the floating node through the transfer transistor to the photoelectrical conversion element can be prevented.

DETAILED DESCRIPTION OF THE PREFERRED EMBODIMENTS

Preferred embodiments according to the present invention will be described hereunder with reference to the accompanying drawings.

Figure 1:
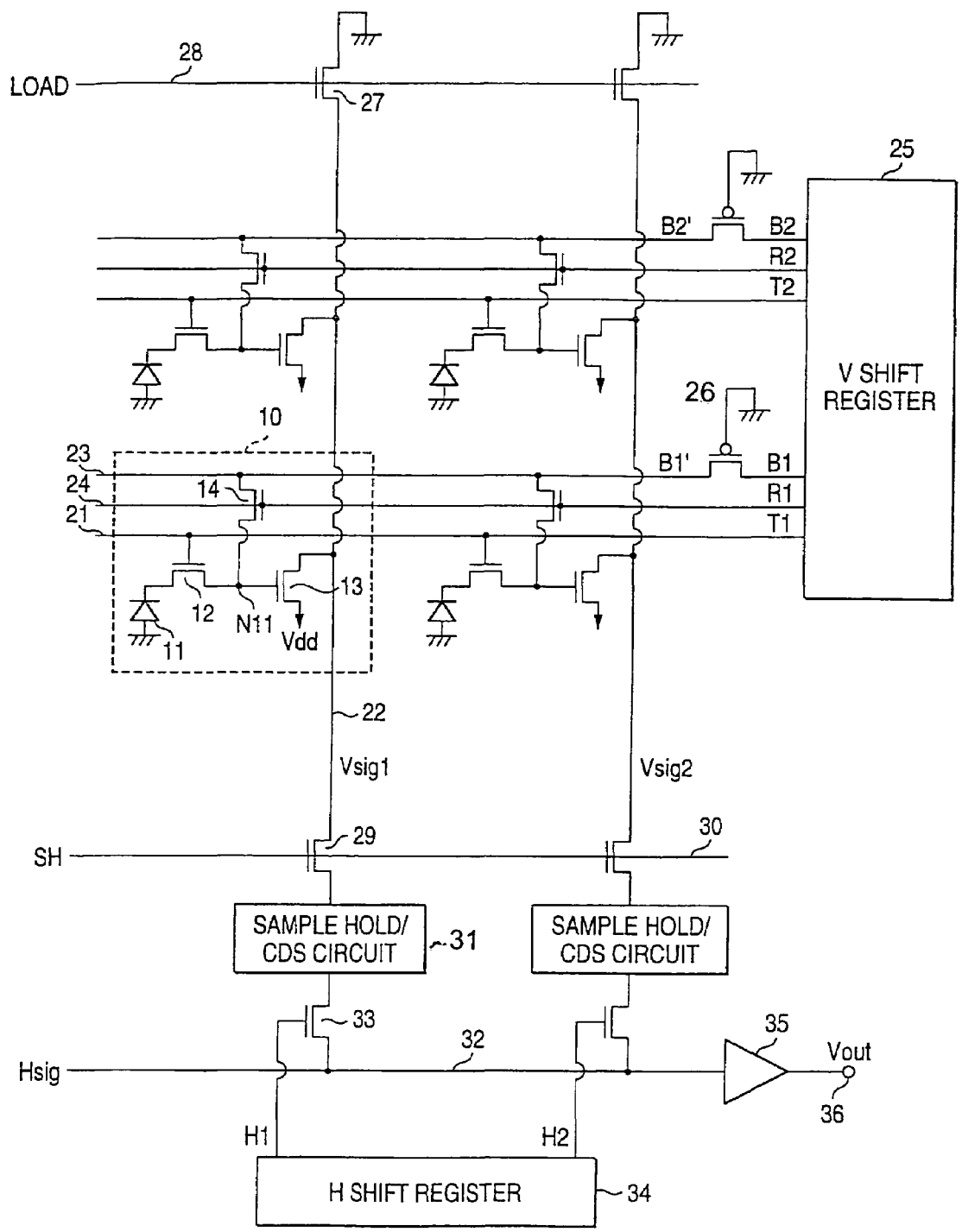
FIG. 1 is a circuit diagram showing the construction of an MOS-type solid-state image pickup device according to an embodiment of the present invention.

FIG. 1 is a circuit diagram showing the construction example of an MOS-type solid-state image pickup device according to a first embodiment of the present invention.

In the MOS-type solid-state image pickup device, many unit pixels are arranged in a matrix form, however, in order to simplify the illustration, these unit pixels are simply illustrated as a pixel array of 2 lines×2 columns.

In FIG. 1, a unit pixel 10 is designed in a three-transistor structure including three N-type MOS transistors, that is, a transfer transistor 12, an amplifying transistor 13 and a reset transistor 14 in addition to a photoelectrical conversion element such as a photodiode 11.

In the pixel array as described above, the photodiode 11 photoelectrically converts incident light to signal charges (for example, electrons) having the charge amount corresponding to the light amount of the incident light and accumulates the signal charges.

The transfer transistor 12 is connected between the cathode of the photodiode 11 and a floating node N11, and the gate thereof is connected to a vertical selection line 21. The transfer transistor 12 has a function of transferring the signal charges accumulated in the photodiode 11 to the floating node N11 when it is set to a conduction state (ON).

The amplifying transistor 13 is connected between a vertical signal line 22 and a power source Vdd, and the gate thereof is connected to the floating node N11. It has a function of outputting the potential of the floating node N11 to the vertical signal line 22.

With respect to the reset transistor 14, the drain thereof (one main electrode) is connected to a drain line (wire) 23, the source thereof (the other main electrode) is connected to the floating node N11, and the gate thereof is connected to the reset line 24, and with this connection arrangement, it has a function of resetting the potential of the floating node N11.

In a pixel area (image pickup area) in which these unit pixels 10 are arranged in a matrix form, respective three lines of the vertical selection line 21, the drain line 23 and the reset line 24 are wired in the horizontal (H) direction (the right-and-left direction in FIG. 1) for every line of the pixel array, and the respective vertical signal lines 22 are wired in the vertical (V) direction (the up-and-down direction) every column.

The vertical selection line 21 and the reset line 24 are directly connected to the respective output terminals of a V shift register 25 constituting the vertical driving circuit, which outputs a vertical selection pulse T and a reset pulse R every line. The drain line 23 is connected to each reset voltage output terminal of the V shift register 25 through each P-type MOS transistor 26 every line. The gate of the P-type MOS transistor 26 is grounded.

At the upper side of the pixel area, a load transistor 27 comprising an N-type MOS transistor is connected between one end of the vertical signal line 22 and the ground every column. The gate of the load transistor 27 is connected a load (Load) line 28 and it serves as a constant current source.

At the lower side of the pixel area, one terminal (one main electrode) of a sample hold (SH) switch 29 comprising an N-type MOS transistor is connected to the other end of the vertical signal line 22. The control terminal (gate) of the sample hold switch 29 is connected to an SH line 30.

The input terminal of a sample hold/CDS (Correlated Double Sampling) circuit 31 is connected to the other terminal (the other main electrode) of the sample hold switch 29. The sample hold/CDS circuit 31 samples and holds the potential Vsig of the vertical signal line 22 and conducts the correlated double sampling (CDS). Here, the correlated double sampling means the processing of sampling two voltage signals input time-serially and then outputting the differential value therebetween.

A horizontal selection switch 33 comprising an N-type MOS transistor is connected between the output terminal of the sample hold/CDS circuit 31 and the horizontal signal line 32. Horizontal scanning pulses H (H1, H2, . . . ) that are successively output during the horizontal scanning operation are supplied from an H shift register 34 constituting a horizontal driving circuit to the control terminal (gate) of the horizontal selection switch 33.

When the horizontal scanning pulses H are supplied and thus the horizontal selection switch 33 is turned on, the signal which has been subjected to CDS in the sample hold/CDS circuit 31 is read out through the horizontal selection switch 33 to the horizontal signal line 32. The signal Hsig thus read out is led out as an output signal Vout from the output terminal 36 through an output amplifier 35 connected to one end of the horizontal signal line 32.

Figure 2:
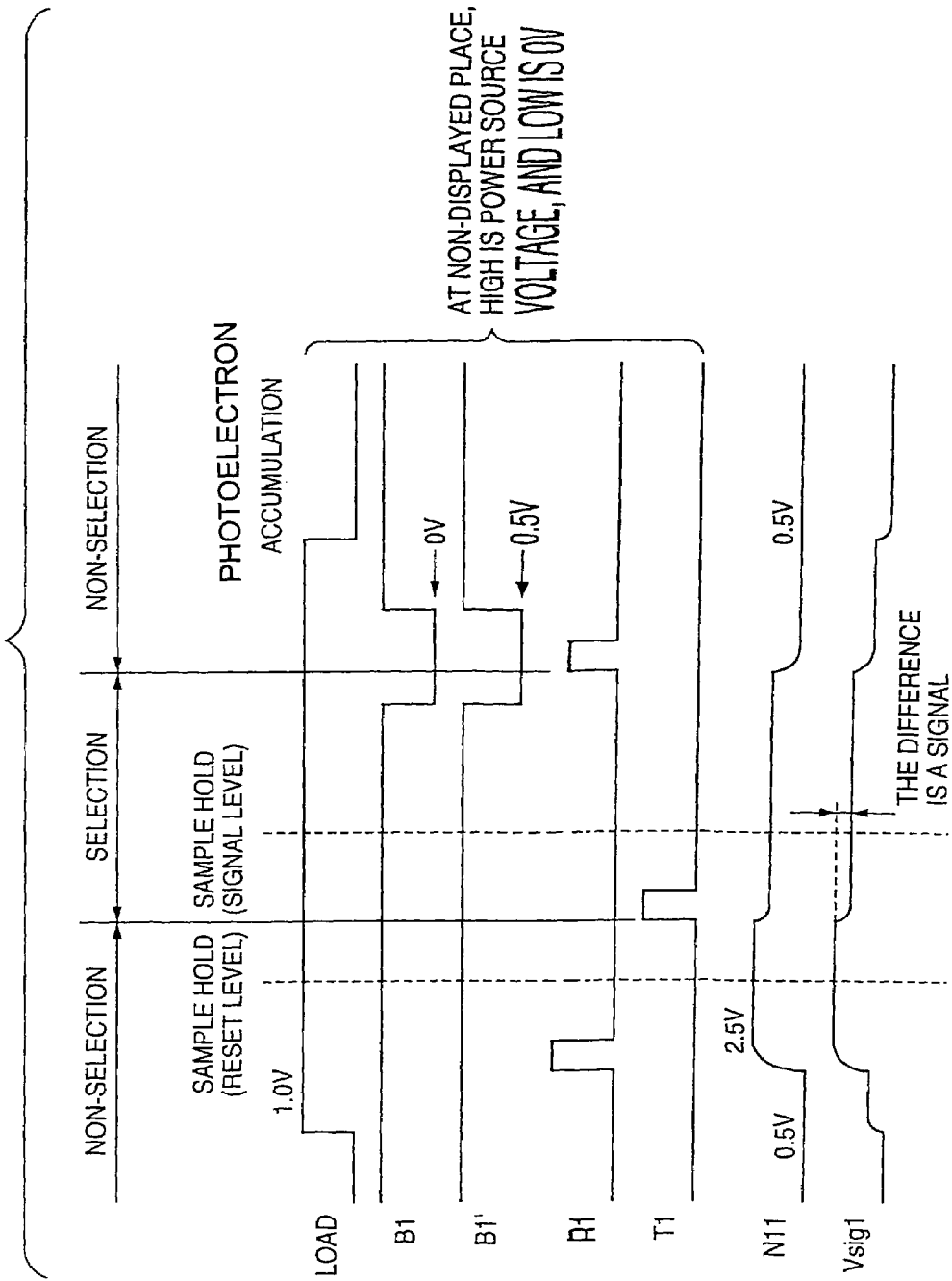
FIG. 2 is a timing chart showing the operation of the MOS-type solid-state image pickup device according to this embodiment.

Next, the operation of the MOS type solid-state-image pickup device according to this embodiment will be described with reference to the timing chart of FIG. 2. In this case, the description will be made while paying attention to the pixel at the lower left side of FIG. 1.

First, at the non-selection time (when the unit pixel is not selected), the potential of the floating node N11 is set to 0.5V. At this time, the power source voltage Vdd, for example, 3.0V is output as a reset voltage B1 from the V shift register 25 and thus the P-type MOS transistor 26 is conducted, so that the potential B1' of the drain line 23 is also set to the power source voltage Vdd.

When a load (Load) signal to be applied to the load line 28 is set to 1.0V, for example, and then a reset signal R1 having H level is output from the V shift register 25, the floating node N11 is connected to the drain line 23 through the reset transistor 14 because the reset transistor 14 is conductive. Therefore, the potential of the floating node N11 is reset to the H level determined by the channel voltage of the reset transistor 14 (for example, 2.5V), whereby the gate potential of the amplifying transistor 13 is also set to 2.5V.

The potential Vsig1 of the vertical signal line 22 is determined by the highest one of the gate voltages of the amplifying transistors of many pixels which are arranged in the vertical direction and connected to the vertical signal line 22, so that the potential Vsig1 of the vertical signal line 22 is determined by the potential of the floating node N11. Specifically, the amplifying transistor 13 forms a source follower in combination with a load transistor 27, and the output voltage thereof appears as the pixel potential Vsig1 on the vertical signal line 22. The potential Vsig1 at this time is set as a voltage having reset level. The reset-level voltage is input through the sample hold switch 29 to the sample hold/CDS circuit 31.

Subsequently, a vertical selection pulse T1 output from the V shift register 25 is set to H level. In this case, the transfer transistor 12 is conducted, photoelectrical conversion is conducted in the photodiode 11, and signal charges (in this case, electrons) accumulated are transferred (read) to the floating node N11, whereby the gate potential of the amplifying transistor 13 is varied in the negative direction in accordance with the signal amount of the signal charges read out from the photodiode 11 to the floating node N11, and this variation induces variation of the potential Vsig1 of the vertical signal line 22.

The potential Vsig1 at this time corresponds to the voltage having the original signal level. This signal level voltage is input through the sample hold switch 29 to the sample hold/CDS circuit 31. The sample hold/CDS circuit 31 carries out the processing of differentiating the previous reset level voltage and the current signal level voltage and holding the differential voltage thus achieved.

Subsequently, the reset voltage B1 output from the V shift register 25 is set to 0V. At this time, the reset voltage B1' supplied through the drain line 23 to the pixel 10 is not equal to 0V, but it is determined by the channel voltage of the P-type MOS transistor 26, for example, it is equal to 0.5V.

If the reset signal R1 having the H level is output from the V shift register 25 under the above state, the reset transistor 14 is conductive, so that the floating node N11 is linked to the drain line 23 through the reset transistor 14, and the potential thereof is equal to the potential of the drain line 23, that is, 0.5V. Therefore, the pixel 10 is restored to the non-selection state.

Under the non-selection state, the potential of the floating node N11 is not equal to 0V, but 0.5V, and thus electrons are prevented from leaking through the transfer transistor 12 to the photodiode 11. Here, the potential of the floating node N11 is set to 0.5V by the action of the P-type MOS transistor 26 disposed between the reset voltage output terminal of the V shift register 25 and the drain line 23.

All the pixels on the first line are simultaneously driven through the above sequential operation, and the signals of one line are simultaneously held (stored) in the sample hold/CDS circuits 31. Thereafter, the processing enters a next photoelectric conversion (exposure) and photoelectrons accumulation period in the photodiode 11. As described in the timing chart of FIG. 2, the H shift register 34 starts the horizontal scanning operation during the photoelectron accumulation period, and successively outputs the horizontal scanning pulses H1, H2, . . . , whereby the horizontal selection switches 33 are successively conducted to successively lead the signals held in the sample hold/CDS circuits 31 to the horizontal signal line 32.

When the same operation is carried out on the pixels on the second line, the pixel signals of the pixels on the second line are read out. Subsequently, the pixel signals of all the lines can be read out by the successive vertical scanning operation of the V shift register 25, and the signals of all the pixels can be read out by the successive horizontal scanning operation of the H shift register 34 every line.

As described above, in the MOS type solid-state image pickup device having the three-transistor structure in which each unit pixel 10 has the transfer transistor 12, the amplifying transistor 13 and the reset transistor 14, the P-type MOS transistor 26 is connected between the reset voltage output terminal of the V shift register 25 and the drain line 23, whereby the potential of the floating node N11 is equal to 0.5V, for example. Therefore, electrons can be prevented from being leaked through the transfer transistor 12 to the photodiode 11.

Accordingly, the noises caused by the leakage of electrons from the floating node N11 to the photodiode 11 can be suppressed. Further, the present invention can be implemented by a simple circuit construction in which only one MOS transistor is added every line, and thus the circuit scale may be extremely small. In addition, the present invention does not need any current flow that has been hitherto required in the case of a resistance-dividing manner when an intermittent voltage (in this embodiment, 0.5V) is generated. Therefore, increase of power consumption can be suppressed.

In the above embodiment, the P-type MOS transistor 26 is connected between the reset voltage output terminal of the V shift register 25 and the drain line 23, and the gate thereof is grounded. However, the present invention is not limited to this construction. The P-type MOS transistor is not required to have a gate, but it may be equipped with a P-type potential-constant channel. There has been achieved an inventor's experiment result showing that the channel voltage is preferably set to 0.4V to 0.7V in order to prevent the leakage of electrons to the photodiode and suppress the reduction of the voltage margin.

Figure 3:
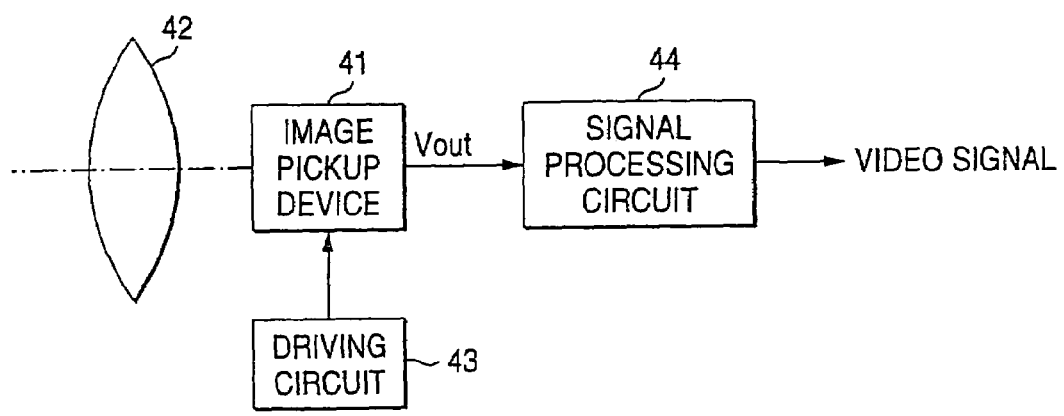
FIG. 3 is a block diagram showing an example of the construction of a camera system according to the present invention.
Figure 4:
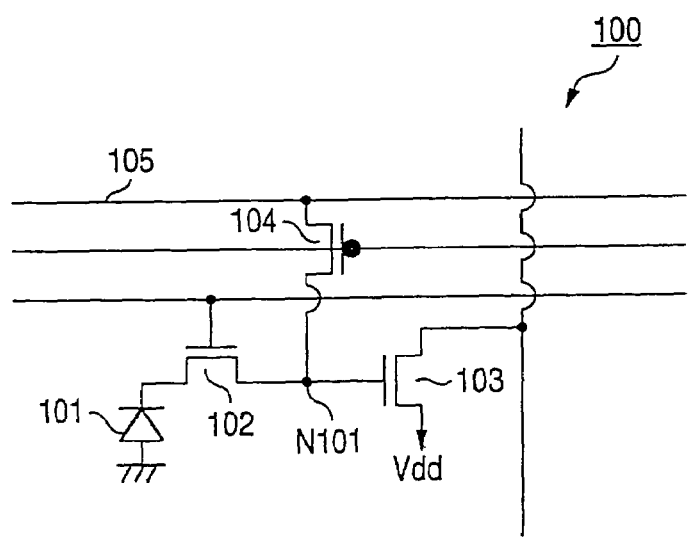
FIG. 4 is a diagram showing the construction of a unit pixel to describe the problem of the conventional technique.

FIG. 3 is a block diagram schematically showing the construction of a camera system according to another embodiment of the present invention.

The camera system includes an image pickup device 41, an optical system for guiding incident light to the pixel area of the image pickup device 41, for example, a lens 42 for focusing the incident light (image light) onto the imaging face, a driving circuit 43 for driving the image pickup device 41, and a signal processing circuit 44 for processing the output signal of the image pickup device 41.

This camera system uses as the image pickup device 41 the solid-state image pickup device according to the first embodiment, that is, the MOS-type solid-state image pickup device having the three-transistor structure in which each unit pixel 10 includes not only the photodiode 11, but also the transfer transistor 12, the amplifying transistor 13 and the reset transistor 14, and the P-type MOS transistor 26 is connected between the reset voltage output terminal of the V shift register 25 and the drain line 23.

The driving circuit 43 has a timing generator (not shown) for generating various timing signals containing a start pulse and a clock pulse to drive the V shift register 25 and the H shift register 34 shown in FIG. 1, and drives the image pickup device (MOS type solid-state image pickup device) 41 in order to implement the driving operation described in the above-described example of the operation. The signal processing circuit 44 carries out various signal processing on the output signals Vout of the MOS-type solid-state image pickup device 41 and outputs the processed signals as video signals.

As described above, according to the camera system of this embodiment, the MOS-type solid-state image pickup device as described above is used as the image pickup device 41, so that the MOS-type solid-state image pickup device concerned can reduce the noises due to the leakage of electrons from the floating nodes to the photodiodes without increasing the power consumption with a small circuit scale. Therefore, a high image quality pickup image can be achieved with small circuit scale/low power consumption and with little noise.

As described above, according to the present invention, in a solid-state image pickup device in which a unit pixel has a photoelectrical conversion element, a transfer transistor for transferring a signal of the photoelectrical conversion element to a floating node, an amplifying transistor for outputting a signal of the floating node to a signal line, and a reset transistor for resetting said floating node, a P-type MOS transistor is connected between a wire to which a main electrode of the reset transistor at the opposite side to the floating node is connected and a driving circuit for selectively applying a reset voltage to the wire. Therefore, the leakage of the charges from the floating node to the photoelectrical conversion element can be prevented, and thus the noises due to the leakage can be reduced.

What is claimed is:

1. A solid-state image pickup device having:
unit pixels arranged in a matrix form, each pixel unit comprising a photoelectrical conversion element, a transfer transistor for transferring a signal of said photoelectrical conversion element to a floating node, an amplifying transistor for outputting a signal of said floating node to a signal line, a reset transistor for resetting said floating node, and a P-type MOS transistor, wherein said P-type MOS transistor is connected between a wire to which a main electrode of said reset transistor at the opposite side to said floating node is connected and a driving circuit for selectively applying a reset voltage to said wire, wherein the channel voltage of said P-type MOS transistor is equal to 0.4V to 0.7V.

2. A camera system comprising:
a solid-state image pickup device in which a unit pixel has a photoelectrical conversion element, a transfer transistor for transferring a signal of said photoelectrical conversion element to a floating node, an amplifying transistor for outputting a signal of said floating node to a signal line, a reset transistor for resetting said floating node, a P-type MOS transistor, an optical system for guiding incident light to said image pickup portion of said solid-state image pickup device; and a signal processing circuit for processing the output signal of said solid-state image pickup device, wherein said P-type MOS transistor, is connected between a wire to which a main electrode of said reset transistor at the opposite side to said floating node is connected and a driving circuit for selectively applying a reset voltage to said wire, and wherein the channel voltage of said P-type MOS transistor is equal to 0.4V to 0.7V.

* * * * *